United States Patent
Brown et al.

(10) Patent No.: US 9,497,589 B2
(45) Date of Patent: Nov. 15, 2016

(54) SYSTEMS AND METHODS FOR MANAGING SENSITIVE DATA STORED ON A WIRELESS COMPUTING DEVICE

(71) Applicant: International Business Machines Corporation, Armonk, NY (US)

(72) Inventors: Gene L. Brown, Durham, CT (US); Brendan F. Coffey, Rhinebeck, NY (US); Christopher J. Dawson, Arlington, VA (US); Clifford V. Harris, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/552,790

(22) Filed: Nov. 25, 2014

(65) Prior Publication Data

US 2016/0150365 A1    May 26, 2016

(51) Int. Cl.
*H04W 24/00* (2009.01)
*H04W 4/02* (2009.01)
*H04W 12/08* (2009.01)

(52) U.S. Cl.
CPC ............ *H04W 4/021* (2013.01); *H04W 12/08* (2013.01)

(58) Field of Classification Search
CPC .............................. H04W 4/021; H04W 12/08
USPC ..................... 455/456.1, 41.2, 420, 456.3
See application file for complete search history.

(56) References Cited

U.S. PATENT DOCUMENTS

| | | | |
|---|---|---|---|
| 8,320,931 B2 | 11/2012 | Ward et al. | |
| 2008/0014869 A1 | 1/2008 | Demirbasa et al. | |
| 2010/0127919 A1* | 5/2010 | Curran | G01S 19/40 340/573.4 |
| 2011/0238300 A1* | 9/2011 | Schenken | B60W 40/09 701/408 |
| 2012/0172027 A1* | 7/2012 | Partheesh | H04W 4/021 455/420 |

OTHER PUBLICATIONS

Yung-Wei Kao, et al., uCloud: a user-centric key management scheme for cloud data protection, IET Inf. Secur., 2013, vol. 7, Iss. 2, pp. 144-154.
Disclosed Anonymously, Method for secure data storage in a dynamic mobile environment, an IP.com Prior Art Database Technical Disclosure, IP.com No. IPCOM000078430D, Feb. 25, 2005. pp. 1-8.
Gucer, Vasfi, et al., Deployment Guide Series: Tivoli Continuous Data Protection for Files V3.1, ibm.com/redbooks, Aug. 2007, pp. 1-420.
Maasters Center, Mobile Device Management (MDM), http://www.maas360.com/maasters/forums/mobile-device-management-mdm/show/764/geo-fence-policies, as of Jul. 31, 2014, pp. 1-3.
Amtel, Geofencing & Location Based Control, http://www.amtelnet.com/mobile-device-management-solutions/geofencing-location-based-control, as of Jul. 31, 2014, pp. 1-3.
Air-Watch, Enterprise Mobile Content Management, MCM Software, http://www.air-watch.com/solutions/mobile-content-management, as of Jul. 31, 2014, pp. 1-7.

* cited by examiner

*Primary Examiner* — Martin Mushambo
(74) *Attorney, Agent, or Firm* — George R. McGuire; Bond Schoeneck & King, PLLC; John Pivnichny (57) ABSTRACT

Methods and systems for managing sensitive data stored on a wireless computing device associated with a geofence. The system or method identifies sensitive data stored on the wireless computing device, defines a geofence based at least in part on a parameter associated with a user of the wireless computing device, continuously or periodically determines the location of the wireless computing device relative to the first geofence, and modifies, if the wireless computing device is located outside the first geofence, the identified sensitive data on the wireless computing device.

7 Claims, 3 Drawing Sheets

SYSTEMS AND METHODS FOR MANAGING SENSITIVE DATA STORED ON A WIRELESS COMPUTING DEVICE

FIELD OF THE DISCLOSURE

The present disclosure is directed to systems and methods for ensuring data security, and more specifically, to systems and methods for ensuring data security using dynamic geofencing.

BACKGROUND

Wireless devices, including laptops, storage media, and smartphones, among others, are ubiquitous. Employees bring wireless devices to their work places on a daily basis, and these devices can carry gigabytes of sensitive and/or confidential information. For example, laptops, smartphones, and other wireless computing devices can store customer information such as bank account numbers, health information, credit card information, social security numbers, and a variety of other confidential information. As a result, both individuals and businesses struggle to maintain security control over critical data that may exist on their computing devices.

Almost on a daily basis there are news reports of laptops or storage media with sensitive or confidential information being stolen or lost, prompting recalls and other remediation plans. Not only is remediation following a breach of information expensive, but it can expose a business to legal challenges and cause permanent damage to the business' brand.

Wireless devices often have inherent security measures, including password protection. However, even if a wireless device is password-protected, unencrypted data can easily be obtained from the device. Further, even encrypted data can eventually be unencrypted with sufficient time and resources. Permanent deletion of confidential and/or sensitive information from a wireless computing device is desirable when the device is lost or stolen.

Accordingly, there is a need in the art for methods and apparatus for ensuring data security, and more specifically, to systems and methods for ensuring that confidential and/or sensitive information stored on a wireless computing device is deleted if the device is lost or stolen.

BRIEF SUMMARY

The present disclosure is directed to inventive methods and systems for deleting confidential and/or sensitive information stored on a wireless computing device when that device is lost, stolen, or violates a company's geofence boundary. Accordingly, various embodiments herein are directed to a data security method in which a location-aware wireless computing device initiates a data backup and/or deletion protocol once the device moves outside a dynamically-defined geofence.

In one aspect, a method for managing sensitive data stored on a wireless computing device, the method including the steps of: identifying sensitive data stored on the wireless computing device; defining a first geofence, wherein the geofence is defined at least in part by a parameter associated with a user of the wireless computing device; determining the location of the wireless computing device relative to the first geofence; and modifying, if the wireless computing device is located outside the first geofence, the identified sensitive data on the wireless computing device.

According to an embodiment, the method further includes the steps of, prior to modifying the identified sensitive data on the wireless computing device, of: establishing, if the wireless computing device is located outside the first geofence, a wireless connection between the wireless computing device and a remote server; transmitting the identified sensitive data to the remote server.

According to an embodiment, the method further includes the steps of monitoring, periodically, the location of the wireless computing device relative to the first geofence; establishing, if the wireless computing device is located inside the first geofence, a wireless connection between the wireless computing device and a remote server; and transmitting the identified sensitive data from the remote server to the wireless computing device.

According to an embodiment, the method further includes the step of monitoring, periodically, the location of the wireless computing device relative to the first geofence; and returning the identified sensitive data stored on the wireless computing device to an unmodified state. According to an embodiment, returning the identified sensitive data stored on the wireless computing device to an unmodified state comprises unencrypting the identified sensitive data.

According to an embodiment, the modification comprises deletion of the identified sensitive data and/or encryption of the identified sensitive data.

According to an embodiment, the method further includes the step of changing a parameter of the first geofence.

According to an embodiment, the geofence is defined at least in part by the date.

According to an embodiment, the step of defining a first geofence comprises the steps of receiving information about a planned schedule for the user; and utilizing the received information in the definition of the first geofence. According to an embodiment, the planned schedule comprises a calendar.

According to an embodiment, the method further includes the step of sending information about the location of the wireless computing device relative to the first geofence to another user.

According to an aspect is a method for managing sensitive data stored on a wireless computing device, including the steps of identifying sensitive data stored on the wireless computing device; defining a first geofence, wherein the geofence is defined at least in part by a parameter associated with a user of the wireless computing device; determining the location of the wireless computing device relative to the first geofence; prompting, if the wireless computing device is located outside the first geofence, the user of the wireless computing device to provide an predetermined input; determining whether the predetermined input has been received from the user within a predetermined amount of time; and modifying, if the predetermined input is not received from the user after the predetermined amount of time, the identified sensitive data on the wireless computing device after it is transmitted to the remote server.

According to an embodiment, the method further includes the steps of, prior to modifying the identified sensitive data on the wireless computing device, establishing, if the input is not received from the user after the predetermined amount of time, a wireless connection between the wireless computing device and a remote server; and transmitting the identified sensitive data to the remote server.

According to an embodiment, the method further includes the steps of monitoring, periodically, the location of the wireless computing device relative to the first geofence; and returning the identified sensitive data stored on the wireless computing device to an unmodified state. According to an embodiment, returning the identified sensitive data stored on the wireless computing device to an unmodified state comprises unencrypting the identified sensitive data.

According to an embodiment, modification comprises deletion of the identified sensitive data and/or encryption of the identified sensitive data.

According to an embodiment, the step of defining a first geofence comprises the steps of receiving information about a planned schedule for the user; and utilizing the received information in the definition of the first geofence.

According to an aspect is a data management system including: a wireless computing device, the wireless computing device comprising: (i) a non-transitory storage medium comprising sensitive data, and further comprising information about a geofence, wherein the geofence is defined at least in part by a parameter associated with a user of the wireless computing device; (ii) a GPS receiver; (iii) a wireless transceiver; and (iv) an erase module; a wireless transceiver; and a remote server in communication with the wireless transceiver, the remote server comprising a non-transitory storage medium.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

The present disclosure is directed to inventive methods and systems for deleting confidential and/or sensitive information stored on a wireless computing device when that device is lost or stolen. Accordingly, various embodiments herein are directed to a data security method in which a location-aware wireless computing device initiates a data backup and/or deletion protocol once the device moves outside a dynamically-defined geofence.

Figure 1:
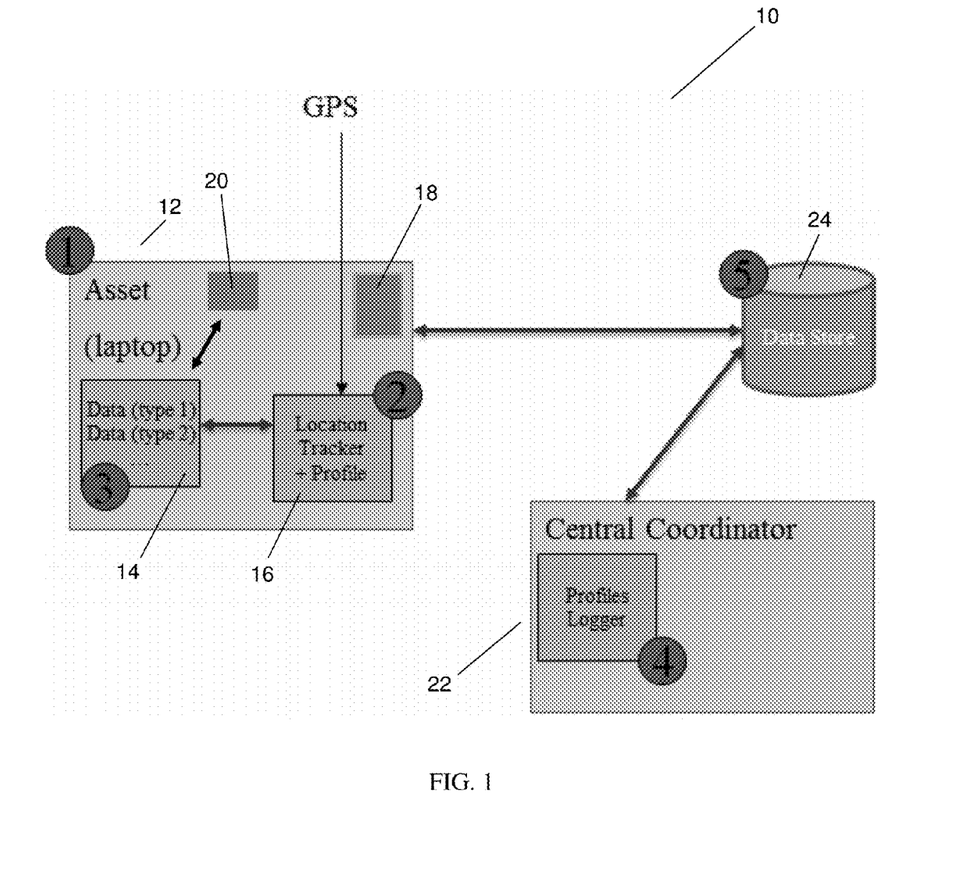
FIG. 1 is a schematic representation of a sensitive data management system in accordance with an embodiment.

Referring now to the drawings, wherein like reference numerals refer to like parts throughout, there is seen in FIG. 1 a system 10 for protecting the security of confidential and/or sensitive information stored on a wireless computing device 12. The wireless computing device can be any device, including but not limited to a laptop, storage medium, smartphone, PDA device, and any of a variety of other devices.

Wireless computing device 12 includes a non-transitory storage medium 14, such as a hard drive, flash drive, or one of a variety of different storage media. According to an embodiment, storage medium 14 comprises both sensitive data, as well as information about a geofence associated with the wireless computing device. Associated with the storage medium 14 is an modification module 20 configured to modify part or all of the data stored on storage medium 14. Wireless computing device 12 further includes a Global Positioning System ("GPS") receiver 16 configured to receive wireless GPS signals. Wireless computing device 12 further includes a wireless transceiver 18, such as a Bluetooth transceiver, a WiFi transceiver, and/or a cellular signal transceiver, among other possible transceivers.

Wireless computing device 12 may include, according to an embodiment, a software element or module (denoted as element "2" in FIG. 1) configured to receive information about the location of the device, such as from the GPS receiver 16 and/or the wireless transceiver 18. It can also store information about the user of the device, such as a profile, which is utilized at least in part to define a geofence associated with the wireless computing device. The software module 2 may also be configured to execute one or more actions to modify the sensitive data stored on the non-transitory storage medium 14. For example, the software module 2 may be configured to instruct modification module 20 to modify part or all of the data stored on storage medium 14 in response to a predetermined trigger, event, time, or place. As just one example, the software module 2 may be configured to instruct modification module 20 to erase part or all of the data stored on storage medium 14 in response to a predetermined trigger, event, time, or place.

According to an embodiment, system 10 further comprises a remote server 20, which includes or is in communication with a non-transitory storage medium 24 configured to receive and store information from the wireless computing device. The remote server 20 and/or storage medium 24 may also comprise information about a geofence associated with the wireless computing device, a profile or other information associated with the user of the wireless computing device, or a variety of other information. The server can also comprise, or be in communication with, a wireless transceiver (not shown), such as a Bluetooth transceiver, a WiFi transceiver, and/or a cellular signal transceiver, among other possible transceivers.

Figure 2:
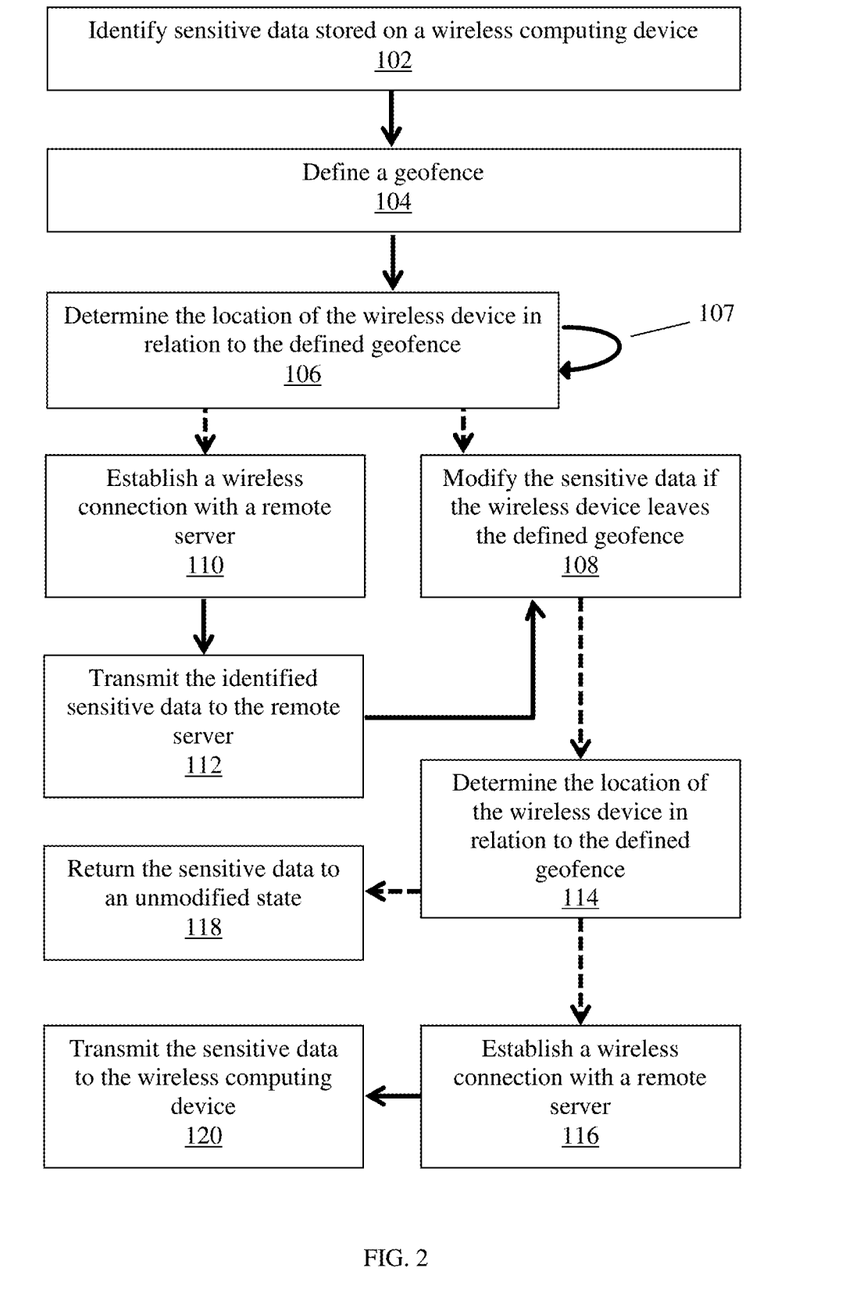
FIG. 2 is a flowchart representation of a sensitive data management method in accordance with an embodiment.

Referring to FIG. 2 is a method for managing sensitive data stored on a wireless computing device, according to an embodiment. The device may be any wireless computing device, including laptops, smartphones, storage media, and other devices. As a preliminary step, a hardware or software agent is deployed within the system for managing sensitive data. For example, the hardware or software agent can be an enterprise agent that is deployed from a centralized control. The hardware or software agent can be deployed on some or all devices equally, or can be deployed in a person-, time-, or place-dependent manner. For example, the hardware or software agent can be dynamically deployed only when sensitive data is created and/or identified on a wireless computing device.

The agent can include or consult rules for sensitive data management. For example, the software can receive, assign, or consult rules that are dependent on one or more of the device, a user, the date, time, and/or day of the week, and/or the location of the device. Rules may include the geofence coordinates or definitions (such as GPS boundaries). Rules may also be directed to alerts to the user, such as text message, email, disabling functions such as shutdown or locking of the device, and/or erasure of identified sensitive data, among others.

At step 102 of the method, sensitive data is created and/or identified on the wireless computing device. For example, the sensitive data may be inherently tagged, similar to DRM rights embedded in commercial video, music, and other types of files. The tag can determine, in part or in whole, the action that is taken on the sensitive data when the wireless device leaves a geofence boundary. Alternatively, the data is identified or tagged as sensitive by the user when the data is created, downloaded, or provided to the device, or it can be identified or tagged as sensitive by the user at a later point.

As yet another embodiment, the data is identified or tagged as sensitive by placing the data into a special folder, file, or other designated storage area. For example, the organizational structure of the wireless device may include a folder, file type, or other area or assignment that automatically designates data stored in and/or associated with that area or assignment as sensitive data. The data can also be identified or tagged as sensitive in response to unauthorized access or an attempt at unauthorized access. In addition to these methods, there are other ways to identify or tag data as being sensitive data upon which one or more security actions or measures can be taken. According to an embodiment, data can be identified, classified, or tagged as sensitive using tags such as RFID tags, which can be attached to the wireless computing device. For example, data may be tagged as sensitive if it is stored on a storage medium that is itself tagged by or associated with an RFID tag. The wireless device can detect the presence of the RFID tag and identify, classify, assign, or tag the data received from the RFID-tagged storage medium as being sensitive data. A single wireless computing device may have different categories, classifications, or tags for different sensitive data.

At step 104 of the method, a geofence is defined. Notably, step 104 can occur before or after step 102. Indeed, the geofence can be defined days, weeks, months, or even years before or after the wireless computing device is associated with the system 10, and/or before or after data is created, identified, or tagged as sensitive data. Further, the geofence definitions or rules can be modified before or after any step of the method. A geofence is a virtual boundary established around a real-world geographical area. Geofences combine a device's awareness of its current location in relation to a geographic location with a defined geographic boundary. For example, a simply circular geofence can be defined by a radius of x around a specific latitude and longitude. Alternatively, a geofence can be defined by a plurality of different geographic locations defined in part or entirely by latitudes and longitudes, proximities, and other point and distance measurements. For example, the property boundaries of a facility can be defined as a geofence. As another example, a geofence can be a room, floor, quadrant, or other component of a building, facility, complex, or campus.

The geofence can be defined by a user, a manager of the system, the hardware or software agent, a tag associated with sensitive data and/or by the data itself. For example, the manager and/or agent may define one or more default geofences around a room, floor, facility, or campus, such that all devices associated with the system have the same geofence. Alternatively, for example, the manager and/or agent may define a geofence which can be unique, overlapping, or identical between one or more users or members of the system, or between one or more devices in the system, or data in the system, for example. For example, user 1 may be associated with a particular geofence definition, in which case the wireless computing device used by user 1 must have an awareness of the user's identity or, at a minimum, the user's associated geofence definition. The geofence can also be defined by the data or a tag associated with the data. For example, the geofence may consist of a first definition if the sensitive data is designated as being of minimal risk, while the geofence may consist of a second definition if a breach of the sensitive data is designated as being of more than a minimal risk. This can be designated, for example, by the data itself, by an indicator tag associated with the data, and/or with the folder or file structure with which the data is stored, among a wide variety of other designation mechanisms.

According to an embodiment, the geofence definition is dynamically defined by one or more factors including but not limited to the device, a user, the date, time, and/or day of the week, and/or the location of the device. The device, system, hardware or software agent, and/or user can dynamically define or modify a geofence.

As an example, User 1 may have permission, recognized by the system, device, and/or hardware or software agent, to take her wireless computing device home with her on Mondays through Thursdays, but not on Fridays or over the weekend. On Fridays through Sundays, the geofence associated with User 1 will be only the room, floor, building, or campus for which User 1 is allowed to utilize the device. As an example, User 1 cannot take the laptop with sensitive data anywhere outside Building Y on Fridays, Saturdays, or Sundays. However, on Mondays through Thursdays, the geofence associated with User 1 is defined or modified to include not only Building Y, but also User 1's residence and possibly the expected (and/or alternative) commute route from Building Y to User 1's residence. Alternatively, the device can be shut down on commutes such that the geofence will be smaller and include only Building Y and User 1's residence; the device would then check its location when it is powered up after the commute.

As another example, User 1 may have permission or clearance to use a smartphone containing sensitive data only within the employer's campus, but may also have permission to use the smartphone on business trips. The geofence may therefore be modified to accommodate User 1's scheduled business trips.

As another example, a device may have multiple users, in which case the wireless computing device will store a profile for each user. The user can then login with their own login and password, thereby activating their own profile with an associated user-specific geofence definition. User 1 may be a manager with a larger geofence than a low-level employee, for example. Indeed, a CIO of the company may only receive an email warning when the device leaves the geofence, while a regular employee may have their manager informed. The stored profile may be manually created or dynamic based on the role (seniority, band level, years of service, security clearance, etc.).

Dynamic modification of the geofence(s) will require that the wireless computing device is aware of the date or day of the week. Further, modification of the geofence(s) may require that the wireless computing device is aware of the user's schedule, which could for example be accessed from a stored and/or online calendar. For example, the agent may continuously or periodically monitor the user's calendar or schedule to determine when and/or if a defined geofence may be modified, or alternatively the agent may check the user's calendar or schedule upon a violation of a geofence rule or boundary to determine if the geofence should be modified based on a planned and/or authorized trip, day, or other calendar-related event.

The geofence can be stored as a series or table of points, as a table of rules, or in any of a variety of other methods. The geofence information is preferably stored on the wireless computing device so that it is able to respond appropriately to location changes as discussed below without requiring communication to another device, computer, or server. This will allow the wireless computing device to complete one or more downstream steps of the method even if the wireless communication capabilities of the device are interrupted, either due to an unforeseen event or due to intentional interference or modification.

At step 106 of the method, the GPS receiver 16 of wireless computing device 12 receives signals comprising location information from one or more GPS transmitters (e.g., satellites), determines its location using the received information, and compares that location to the defined geofence associated with the wireless computing device. For example, GPS receiver 16 of wireless computing device 12 receives GPS signals comprising information from three or more GPS satellites and uses trilateration to determine its location in three-dimensional space, a standard determination performed by GPS receivers. The system, wireless device, and/or hardware or software agent then compares the determined location to the geofence defined in step 104, and determines whether the determined location is in compliance with the geofence rules (e.g., is located within the geofence and/or within a predetermined acceptable margin of error with relation to the geofence). According to another embodiment, wireless computing device 12 receives signals from one or more other positioning elements. For example, the device can detect signals from one or more WiFi, Bluetooth, or other wireless transmitters or transceivers that are associated with a particular location, and can use that information to approximate and/or triangulate a geographic location.

If the determined location is located within the defined geofence, then the system continues to monitor its location, as denoted by step 107 of the method in FIG. 2. For example, the GPS receiver will continue to receive signals comprising location information from one or more GPS transmitters and will continue to determine its location. The system can continuously or periodically compare the determined location to the defined geofence. As one example, steps 106/107 are performed once every few seconds, once a minute, or at some other terminal. As another example, the location of the GPS receiver is continuously determined and the location data is continuously provided for comparison to the geofence.

If the determined location is outside the geofence, then the method proceeds to step 108 and/or step 110.

At step 108, the identified sensitive data is modified as a result of the wireless computing device being located outside the geofence. This can occur immediately upon leaving a geofence, or can occur after a period of time following the violation of a geofence boundary (or as seen in steps 110-112, following a series of other events). The type of modification performed on the identified sensitive data can depend on a wide variety of factors, including but not limited to the user, the data itself, the device, the location, and other factors. Examples of modification include but are not limited to encryption, deletion, and copying, among many other types of modification.

As one example, data may be deleted if the user is identified as user 1, or may be only encrypted for user 2. As another example, data may be encrypted if it is tagged with a 'minimal risk' tag or stored in a 'minimum risk' file or folder, or may be deleted if tagged with a 'maximum risk' tag or stored in a 'maximum risk' file or folder. As another example, data may be encrypted if the device leaves the geofenced floor of a building but entered another floor of the same building, but that same data may be deleted if the device leaves the building entirely. Further, a single wireless device may enact multiple different modifications, which can be simultaneous and/or sequential.

Alternatively, at step 110, the wireless computing device establishes or attempts to establish a wireless connection with the remote server of the system. This can be through any wireless transceiver, including but not limited to cellular, WiFi, Bluetooth, and other wireless transceivers. For example, after the wireless computing device penetrates a geofence boundary and determines that modification is necessary, it can send a wireless signal to nearby transceivers requesting a connection. Once a connection and communication with the remote server or computer or storage medium is established, at step 112 of the method the wireless computing device sends some or all of the sensitive data to the remote server or computer or storage medium.

According to an embodiment, the wireless connection is a secure connection suitable for transmitting the sensitive data. In the event the wireless computing device is unable to establish a connection to the remove server, or if the wireless computing device and/or remote server determine that the connection is not secure, then the method can proceed or default immediately (or after a series of attempts to reconnect) to step 108 for modification of the sensitive data. In the event the transmission of sensitive data is interrupted, the method can default to step 108 for modification of the sensitive data. According to another embodiment, the method proceeds or defaults to step 108 after failure to establish a connection, but only if someone attempts to access the sensitive data.

Once the wireless computing device has sent the sensitive data to the remote server or computer or storage medium, the method can return to step 108 of the method for modification of the data still remaining on the wireless computing device. For example, once the wireless computing device determines that the sensitive data has been transmitted and/or safely received by the remote server, it can then encrypt, delete, or otherwise modify the sensitive data stored on the wireless computing device.

At step 114 of the method, after the sensitive data has been modified (e.g., encrypted, erased/deleted, moved, etc.), the GPS receiver 16 of wireless computing device 12 continues to receive signals comprising location information from one or more GPS transmitters (e.g., satellites), determines its location using the received information, and compares that location to the defined geofence associated with the wireless computing device. The system, wireless device, and/or hardware or software agent compares the determined location to the geofence defined in step 104, and determines whether the determined location is in compliance with the geofence rules (e.g., is located within the geofence and/or within a predetermined acceptable margin of error with relation to the geofence). According to another embodiment, wireless computing device 12 receives signals from one or more other positioning elements. For example, the device can detect signals from one or more WiFi, Bluetooth, or other wireless transmitters or transceivers that are associated with a particular location, and can use that information to approximate and/or triangulate a geographic location.

If the system or device determines that the wireless computing device has moved back within the geofence, then the method may proceed to steps 116 and/or 118. At step 118 the sensitive data is restored to an unmodified state. For example, encrypted data can be unencrypted, data can be moved back to an original file or folder, or any of a variety of other actions can be performed. This can be done automatically upon returning to the geofence, following permission from the remote server or other remote component of the system, or upon receiving input from the user in response to an alert or notification. For example, the device can alert the user to the fact that the device is again within the boundaries of the geofence, and can request permission from the user to return the data to an unmodified state. An alert can be, for example, a noise, vibration, text message, email, light, or other notification.

At step 116, the wireless computing device establishes or attempts to establish a wireless connection with the remote server of the system. This can be through any wireless transceiver, including but not limited to cellular, WiFi, Bluetooth, and other wireless transceivers. For example, after the wireless computing device returns to a location within the geofence boundary, it can send a wireless signal to nearby transceivers requesting a connection. Once a connection and communication with the remote server or computer or storage medium is established, at step 120 of the method the remote server or computer or storage medium returns some or all of the sensitive data to the wireless computing device. This can be done automatically upon returning to the geofence, following permission from the remote server or other remote component of the system, or upon receiving input from the user in response to an alert or notification. For example, the device can alert the user to the fact that the device is again within the boundaries of the geofence, and can request permission from the user to return the data to the device from the remote component. According to an embodiment, the wireless connection is a secure connection suitable for transmitting the sensitive data. In the event the wireless computing device is unable to establish a connection to the remove server, or if the wireless computing device and/or remote server determine that the connection is not secure, then the method can proceed or default immediately (or after a series of attempts to reconnect) to another step of the method.

Figure 3:
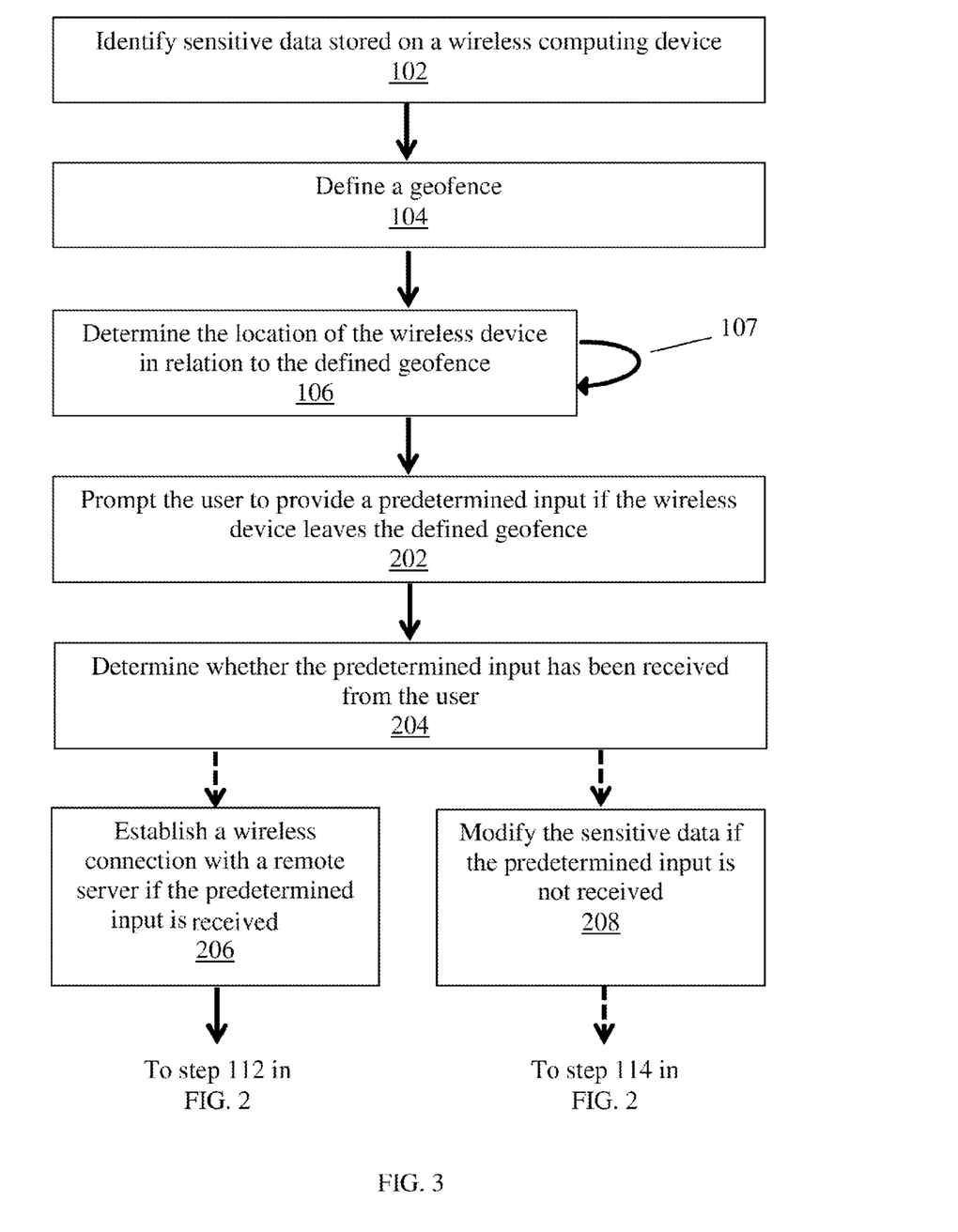
FIG. 3 is a flowchart representation of a sensitive data management method in accordance with an embodiment.

Referring to FIG. 3 is a variation of the method depicted in FIG. 2, which may be employed separately or in combination—either in part or in whole—with the method described in relation to FIG. 2. Steps 102, 104, 106, and 107 of the method depicted in FIG. 3 are similar or identical to the method depicted in FIG. 2. At step 106, the GPS receiver 16 of wireless computing device 12 receives signals comprising location information from one or more GPS transmitters (e.g., satellites), determines its location using the received information, and compares that location to the defined geofence associated with the wireless computing device. The system, wireless device, and/or hardware or software agent compares the determined location to the geofence defined in step 104, and determines whether the determined location is in compliance with the geofence rules (e.g., is located within the geofence and/or within a predetermined acceptable margin of error with relation to the geofence). As in FIG. 2, the wireless computing device 12 can receive signals from one or more other positioning elements such as WiFi, Bluetooth, or other wireless transmitters or transceivers, which can be instead of or in addition to GPS signals. If the determined location is located within the defined geofence, then the system continues to monitor its location, as denoted by step 107 of the method.

However, if the determined location is outside the geofence, then the method proceeds to step 202 of the method. At step 202, the device alerts the user to the fact that the device has left the geofence, and prompts the user for information. The alert can be, for example, a noise, vibration, text message, email, light, or other notification. According to an embodiment, the device prompts the user to provide a predetermined input that informs the device or system that the geofence violation is allowable. The input can be, for example, a PIN, pattern, symbol, or other user-specific input.

At step 204 of the method, the device determines whether an input has been received from the user, and whether that input matches a predetermined required input. For example, if the input is the user's preprogrammed PIN, then the device waits a certain amount of time for input and determines whether the number(s) input into the device match the user's preprogrammed PIN. As another example, if the input is the user's preprogrammed unlocking pattern on his smartphone, the device will wait 20 seconds for a pattern to be received and will determine whether that received pattern—is there is one—matches the preprogrammed pattern.

If the input is received and it matches the predetermined required input, then the method proceeds to, for example, step 206 of the method and establishes or attempts to establish a wireless connection with the remote server of the system. This can be through any wireless transceiver, including but not limited to cellular, WiFi, Bluetooth, and other wireless transceivers. Once a connection and communication with the remote server or computer or storage medium is established, at step 112 of the method the wireless computing device sends some or all of the sensitive data to the remote server or computer or storage medium. All other steps downstream of 112 can then take place.

If the input is not received, or if the input received does not match the predetermined required input, then the method proceeds to, for example, step 208 of the method and the identified sensitive data is modified. The type of modification performed on the identified sensitive data can depend on a wide variety of factors, including but not limited to the user, the data itself, the device, the location, and other factors. Examples of modification include but are not limited to encryption and deletion, among many other types of modification. The method can then proceed to step 114 of FIG. 2, for example. As another embodiment, the device may be shut down and rendered inaccessible, or is rendered completely inoperable.

According to another embodiment, which can be used in conjunction with any of the embodiments described or otherwise envisioned herein, the wireless computing device and/or system sends an alert to a remote server, computer, or other component of the system when a geofence violation is detected. For example, the device may detect that it has left a geofence and will automatically send an alert to someone other than the user, such as a building security system, a businesses' IT department and/or security administrator, a manager, or other entity that may or may not take remedial action. The alert can be an internal electronic alert, an email, a text message, or any of a wide variety of alerts.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present invention has been described in connection with a preferred embodiment, it should be understood that modifications, alterations, and additions can be made to the invention without departing from the scope of the invention as defined by the claims.

What is claimed is:

1. A method for managing sensitive data stored on a wireless computing device, the method comprising the steps of:
    identifying sensitive data stored on the wireless computing device;
    defining a first geofence, wherein the first geofence is defined at least in part by a parameter associated with a user of the wireless computing device
    determining the location of the wireless computing device relative to the first geofence;
    prompting, if the wireless computing device is located outside the first geofence, the user of the wireless computing device to provide a predetermined input;
    determining whether the predetermined input has been received from the user within a predetermined amount of time;
    modifying, if the predetermined input is not received from the user within the predetermined amount of time, the identified sensitive data on the wireless computing device after it is transmitted to the remote server.

2. The method of claim 1, further comprising the steps, prior to modifying the identified sensitive data on the wireless computing device, of:

establishing, if the input is not received from the user after the predetermined amount of time, a wireless connection between the wireless computing device and a remote server; and transmitting the identified sensitive data to the remote server.

3. The method of claim 1, further comprising the steps of:

monitoring, periodically, the location of the wireless computing device relative to the first geofence; and returning the identified sensitive data stored on the wireless computing device to an unmodified state.

4. The method of claim 3, wherein returning the identified sensitive data stored on the wireless computing device to an unmodified state comprises unencrypting the identified sensitive data.

5. The method of claim 1, wherein said modification comprises deletion of the identified sensitive data.

6. The method of claim 1, wherein said modification comprises encryption of the identified sensitive data.

7. The method of claim 1, wherein the step of defining the first geofence comprises the step of:

receiving information about a planned schedule for the user; and utilizing the received information in the definition of the first geofence.

\* \* \* \* \*